United States Patent
Fazeli et al.

(10) Patent No.: US 12,112,330 B2
(45) Date of Patent: Oct. 8, 2024

(54) APPLICATION SERVER FOR AUTOMATED DATA TRANSFERS AND ASSOCIATED METHODS

(71) Applicant: Wave Financial Inc., Toronto (CA)

(72) Inventors: Mani Fazeli, Toronto (CA); Nishkala Balakrishnan, Toronto (CA); Felix Crux, Toronto (CA); Reza Rahimi, Toronto (CA); Les Whiting, Coquitlam (CA)

(73) Assignee: Wave Financial Inc., Toronto (CA)

( * ) Notice: Subject to any disclaimer, the term of this patent is extended or adjusted under 35 U.S.C. 154(b) by 31 days.

(21) Appl. No.: 17/165,301

(22) Filed: Feb. 2, 2021

(65) Prior Publication Data

US 2021/0158362 A1    May 27, 2021

Related U.S. Application Data

(63) Continuation of application No. 15/998,417, filed on Aug. 15, 2018, now Pat. No. 10,956,910.
(Continued)

(51) Int. Cl.
*G06Q 20/40* (2012.01)
*G06Q 30/04* (2012.01)
(Continued)

(52) U.S. Cl.
CPC ......... *G06Q 20/4016* (2013.01); *G06Q 40/03* (2023.01); *H04L 63/102* (2013.01);
(Continued)

(58) Field of Classification Search
CPC .................. G06Q 20/4016; G06Q 40/025
See application file for complete search history.

(56) References Cited

U.S. PATENT DOCUMENTS 7,774,271 B1    8/2010 Edwards
8,073,759 B1   12/2011 Del Favero
(Continued)

FOREIGN PATENT DOCUMENTS

WO    2012097430    7/2012

OTHER PUBLICATIONS

Jarecki, Stanisław, and Vitaly Shmatikov. "Probabilistic escrow of financial transactions with cumulative threshold disclosure." International Conference on Financial Cryptography and Data Security. Springer, Berlin, Heidelberg, 2005. (Year: 2005).*
(Continued)

*Primary Examiner* — David P Sharvin
*Assistant Examiner* — Brock E Turk
(74) *Attorney, Agent, or Firm* — Smart & Biggar LP

(57) ABSTRACT

An application server for automated data transfers and associated methods are disclosed. A request to initiate a data transfer from a first account of a first entity to a second account of a second entity is received. A request to initiate a first data transfer from the first account to an intermediary account of an intermediate entity is sent to a data transfer server. After a threshold duration of time and while the first data transfer is in flight, transaction data and fraud risk are received. A likelihood that the first data transfer fails without completion based on predetermined authorization criteria is determined. In response to a determination that the likelihood is below a data transfer failure threshold, a request to initiate a second data transfer from the intermediary account to the second account is sent to the data transfer server.

14 Claims, 5 Drawing Sheets

Related U.S. Application Data

(60) Provisional application No. 62/545,807, filed on Aug. 15, 2017.

(51) Int. Cl.
  *G06Q 40/03* (2023.01)
  *H04L 9/40* (2022.01)
  *H04L 67/63* (2022.01)

(52) U.S. Cl.
  CPC ............ *H04L 63/123* (2013.01); *H04L 67/63* (2022.05); *G06Q 30/04* (2013.01)

(56) References Cited

U.S. PATENT DOCUMENTS

| | | | |
|---|---|---|---|
| 8,160,941 | B1 | 4/2012 | Field |
| 8,321,310 | B1 | 11/2012 | Keld |
| 8,639,629 | B1 * | 1/2014 | Hoffman ................ G06Q 20/20 705/64 |
| 11,392,944 | B2 * | 7/2022 | Thomas ............ G06Q 20/3829 |
| 2002/0046162 | A1 | 4/2002 | Sakashita |
| 2002/0152162 | A1 * | 10/2002 | Eda ........................ G06Q 20/02 705/39 |
| 2003/0110136 | A1 | 6/2003 | Well |
| 2003/0233319 | A1 * | 12/2003 | Lawrence ............ G06Q 20/10 705/39 |
| 2006/0196930 | A1 | 9/2006 | Hart |
| 2007/0073618 | A1 * | 3/2007 | Yu ........................ G06Q 20/102 705/40 |
| 2008/0015982 | A1 | 1/2008 | Sokolic |
| 2008/0082601 | A1 | 4/2008 | Meijer |
| 2009/0037461 | A1 | 6/2009 | Keld |
| 2009/0222365 | A1 | 9/2009 | McGlynn |
| 2009/0319427 | A1 | 12/2009 | Gardner |
| 2011/0276473 | A1 * | 11/2011 | Blok ..................... G06Q 20/10 705/39 |
| 2012/0005342 | A1 | 1/2012 | Deng |
| 2013/0091052 | A1 | 4/2013 | Kaperdal |
| 2013/0297510 | A1 | 11/2013 | Ducote |
| 2014/0032399 | A1 * | 1/2014 | Gonthier ............ G06Q 20/4012 705/39 |
| 2014/0052668 | A1 * | 2/2014 | Cameron ............. G06Q 30/018 705/36 R |
| 2014/0365371 | A1 | 12/2014 | Ohlhausen |
| 2015/0278819 | A1 | 10/2015 | Song |
| 2016/0019545 | A1 | 1/2016 | Vastenavondt |
| 2016/0042469 | A1 | 2/2016 | Lochrie et al. |
| 2016/0104252 | A1 | 4/2016 | Simpson et al. |
| 2016/0232534 | A1 * | 8/2016 | Lacey .............. G06Q 20/38215 |
| 2018/0114277 | A1 | 4/2018 | Whitmer |

OTHER PUBLICATIONS

Delina, Radoslav, and Radovan DrÃ¡b. "Trust building on electronic marketplaces in the field of escrow services and online dispute resolution." IDIMT-2009: System and Humans—A Complex Relationship: 17th Interdisciplinary Information Management Talks. Schriftenreihe: Informatik 29 (2009): 149-156. (Year: 2009).*
Final Rejection; U.S. Appl. No. 15/998,417, filed Apr. 30, 2020.
Thomas et al., A Protocol for Interledger Payments; https://interledger.org/interledger.pdf 2015.
Office Action; U.S. Appl. No. 15/998,417, Nov. 8, 2019.
What is Escrow, escrow.com 2017.
Advisory Action; U.S. Appl. No. 15/998,417, Jul. 14, 2020.
Notice of Allowance; U.S. Appl. No. 15/998,417, Nov. 4, 2020.

* cited by examiner

APPLICATION SERVER FOR AUTOMATED DATA TRANSFERS AND ASSOCIATED METHODS

RELATED APPLICATION DATA

The present application is a continuation of non-provisional U.S. patent application Ser. No. 15/998,417, filed Aug. 15, 2018, which claims the benefit of and priority to provisional U.S. patent application No. 62/545,807, filed Aug. 15, 2017, the entire content of these documents being incorporated herein by reference.

TECHNICAL FIELD

The present disclosure relates generally to the field of data transfers, and more particularly to an application server for automated data transfers and associated methods.

BACKGROUND

Data transfers between different entities using different communication platforms suffer from a variety of problems including user authentication, data authentication, data verification, data synchronization, timeliness and data security among other problems. The nature and the severity of these problems depends on a number of factors including the type of data being transferred or exchanged, the number of parties involved, and the communication platforms being used. For some types of applications, such as data transfers involving social media data, blockchain and financial transaction data, accuracy and timeliness are very important and even small reductions in delays may provide significant improvements for users and system administrators. Thus, there remains a need for a server for automated data transfers and associated methods that address at least some of the foregoing problems.

DETAILED DESCRIPTION OF EXAMPLE EMBODIMENTS

Figure 1A:
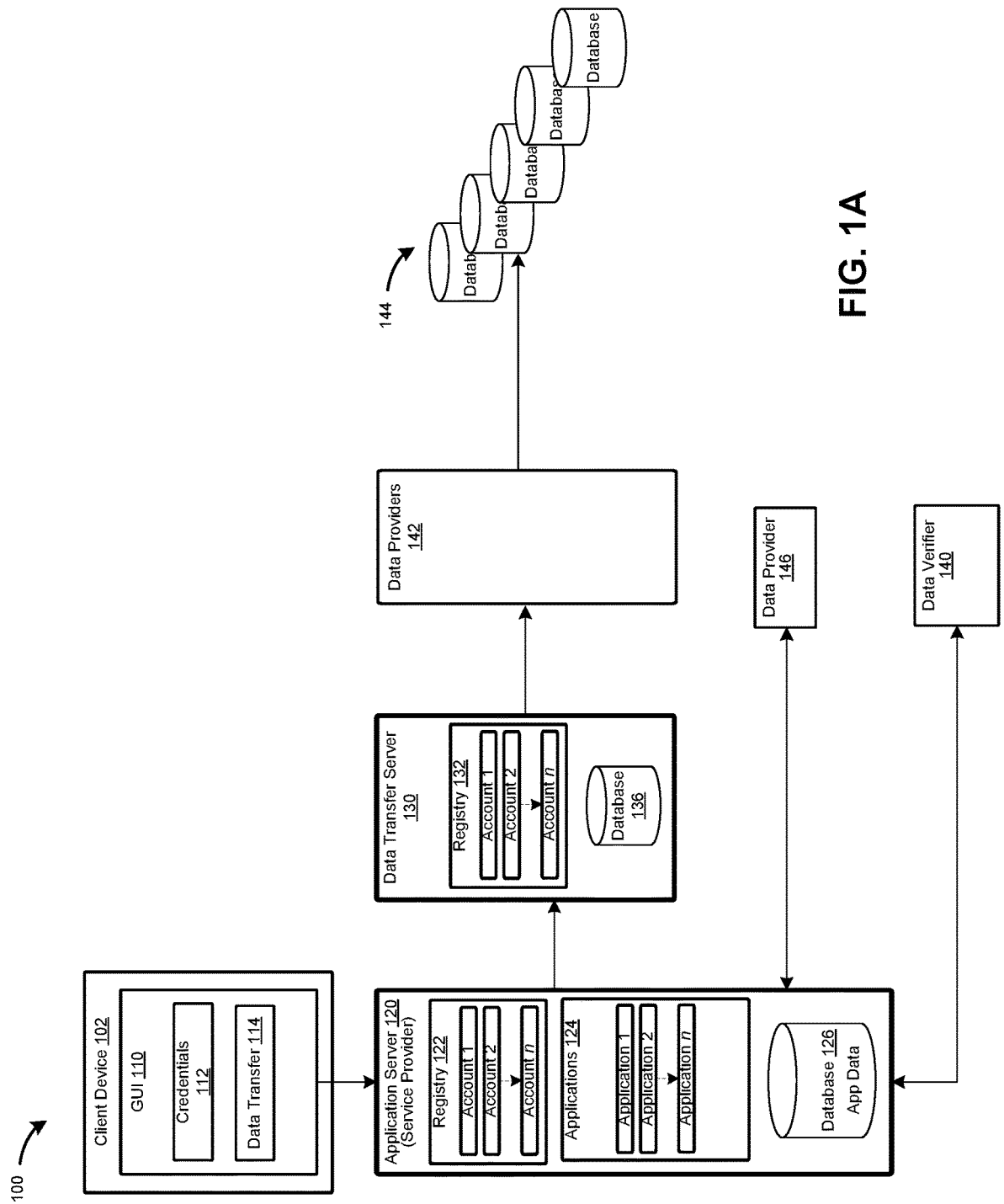
FIG. 1A is a schematic block diagram illustrating a communication system in accordance with a first example embodiment of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

The present disclosure provides a server for automated data transfers and associated methods. Data transfers between entities, such as a first entity and second entity, are performed in two parts via an intermediary. The first data transfer is between a first entity and an intermediary. The second data transfer is between the intermediary and a second entity. The intermediary has access to or knowledge of the data that is subject to the data transfer, and can initiate the second data transfer based on the same data that was the subject of the first data transfer before the first data transfer is completed. For example, the intermediary may act as a repository, custodian or holder of the data that is the subject of the data transfer, even if only temporarily. The second data transfer is initiated in response to a determination that one or more predetermined authorization criteria for initiating the second data transfer have been detected. The predetermined authorization criteria may comprise detection of initiation of the first data transfer but not necessarily completion of the first data transfer, a fraud risk rating of the first entity, a fraud risk rating of the second entity, or any combination of thereof. The detection of the initiation of the first data transfer may be detection/identification of the sending of the data from an account of the first entity via the first data transfer before the data is received by an account of the intermediary.

The data transfer may relate to financial data in some embodiments. When the data transfer relates to financial data, the first data transfer may comprise a first financial transaction (e.g., Automated Clearing House (ACH) debit) between a first entity and an intermediary (service provider) and the second data transfer may comprise a second financial transaction (e.g., ACH credit) between the intermediary and a second entity. The detection of the initiation of the first data transfer, as a predetermined authorization criteria for initiating the second data transfer, may be detection/identification of "in-flight funds" related to the first financial transaction being transfer from an account of the first entity (e.g., a bank account of a first entity) before the funds are received by an account of the intermediary.

The teachings of the present disclosure allow substantially faster data transfers, such as transactions, without substantially reducing security and without substantially increasing risk caused by the possibility of the first data transfer, such as, for example, a first financial transaction, failing particularly when compared with asynchronous systems. Asynchronous systems, such as ACH, are particularly prone to delayed failure notifications, which slows data transfers (e.g., transaction) processing due to the delays caused by waiting for each data transfer/transaction in a data transfer/ transaction sequence or chain to be processed before the next data transfer/transaction is initiated. For example, failure notifications of the ACH system are currently only sent in a batch once daily.

In accordance with one example embodiment of a first aspect of the present disclosure, there is provided a data transfer method, comprising: receiving from a first entity a request to initiate a data transfer from a first account of the first entity to the second account of a second entity; requesting from a data verifier data transfer information for the first account; receiving from the data verifier the data transfer information for the first account data; requesting that a data transfer server initiate a first data transfer from the first account to an intermediary account; requesting from the data verifier first data transfer information after a predetermined duration from the request to initiate the first data transfer; receiving from the data verifier the first data transfer information; determining whether one or more predetermined authorization criteria have been met based on the first data transfer information; in response to a determination that the one or more predetermined authorization criteria have been met, requesting the data transfer server initiate a second data transfer from the intermediary account to a second account.

In some examples, the method further comprises: requesting from a risk assessor fraud risk data concerning one or both of the first entity and the second entity; receiving from the risk assessor the fraud risk data concerning one or both of the first entity and the second entity; wherein the determination of whether one or more predetermined authorization criteria have been met is based on the first data transfer information and the fraud risk data concerning one or both of the first entity and the second entity.

In some examples, the method further comprises: the determination of whether one or more predetermined authorization criteria have been met is based on the first data transfer information, the fraud risk data concerning one or both of the first entity and the second entity, and a data transfer history for the first entity stored in a database of the server.

In some examples, the determination of whether one or more predetermined authorization criteria have been met is further based on an identity of the first entity, an identity of the second entity, and account information for the first account of the first entity.

In some examples, the determination of whether one or more predetermined authorization criteria have been met is further based on historical data transfer data available to the server for a plurality of data transfers for a plurality of entities and a historical fraud risk data available to the server for a plurality of data transfers for a plurality of entities.

In some examples, the first data transfer information comprises a type and/or size of the first data transfer, and wherein the account information comprises balance information.

In some examples, determining whether one or more predetermined authorization criteria have been met comprises: determining whether one or more of the following conditions have been met: (i) a current account balance of the first account less an amount of a first financial transaction that comprises the first data transfer is greater than or equal to a threshold amount; (ii) a data transfer in an opposite direction to the first data transfer for the same or approximately the same size as the first data transfer; (iii) an available account balance of the first account is greater than or equal to a threshold amount; (iv) an expected account balance of the first account is greater than or equal to a threshold amount, wherein expected account balance adjusting for a data transfer in an opposite direction to the first data transfer for the same or approximately the same size as the first data transfer; (v) a history of non-sufficient funds (NSF) transactions of the first account; (vi) whether the first account is overdrawn; (vii) a credit rating of the first entity is greater to or equal to a credit rating threshold; (viii) a status of a data transfer matching the first data transfer; or (ix) fraud risk data satisfies fraud risk criteria.

In some examples, the fraud risk criteria is dependent on a type and/or size of the first data transfer, an amount and/or type of the fraud risk data, and an identity of the first entity.

In some examples, determining whether one or more predetermined authorization criteria have been met comprises: determining a likelihood that the first data transfer fails without completion after being initiated using the one or more predetermined authorization criteria; determining whether the likelihood that the first data transfer fails without completion after being initiated is below a data transfer failure threshold; wherein it is determined that the one or more predetermined authorization criteria have been met in response to a determination that the likelihood that the first data transfer fails without completion after being initiated is below the data transfer failure threshold.

In some examples, the determination of the likelihood that the first data transfer fails without completion after being initiated using the one or more predetermined authorization criteria is based on the first data transfer information, the fraud risk data concerning one or both of the first entity and the second entity, and a data transfer history for the first entity stored in a database of the server.

In some examples, the method further comprises: determining a country and/or financial instruction associated with the first account based on account information for the first account; and determining the one or more predetermined authorization criteria based on the determined country and/or financial instruction associated with the first account.

In some examples, the method further comprises: receiving from the data verifier a token identifying the first entity; requesting from the data verifier identifying information of the first account, wherein the token is provided with the request as authorization to obtain the identifying information of the first account; receiving from the data verifier identifying information of the first account.

In some examples, the method further comprises: receiving from the second entity a request to generate a data transfer instruction; generating the data transfer instruction using application data stored in a database of the server; notifying the first entity of the generated data transfer instruction. In some examples, notifying the first entity of the generated data transfer instruction comprises: sending an electronic message to a message address of the first entity stored in the database of the application server, the electronic message including the generated data transfer instruction or a notification of the generation of the data transfer instruction.

In some examples, the electronic message is an email message or in-application notification.

In some examples, the method further comprises: in response to success or failure of the requested data transfer from the first account of the first entity to the second account of the second entity, sending an electronic message to a message address of the first entity stored in the database of the server, the electronic message including a notification of success or failure of the requested data transfer.

In some examples, the data transfers comprise financial transactions.

In accordance with another example embodiment of a first aspect of the present disclosure, there is provided a data transfer method, performed by an application server, comprising: receiving, over a communications network, a request to initiate a data transfer from a first account of a first entity to a second account of a second entity different from the first entity; sending, to a data transfer server over the communications network, a request to initiate a first data transfer from the first account of the first entity to an intermediary account of an intermediate entity different from the first entity and the second entity; and after a threshold duration from a time at which that the request to initiate the first data transfer was sent and while the first data transfer is in flight: receiving transaction data for the first account of the first entity for the threshold duration and fraud risk data concerning one or both of the first entity and the second entity; determining a likelihood that the first data transfer fails without completion based on predetermined authorization criteria, wherein the predetermined authorization criteria are based on whether a data transfer matching the first data transfer is found in the transaction data for the first account for the threshold duration, a balance of the first account, the fraud risk data concerning one or both of the first entity and the second entity, historical transaction data for a plurality of data transfers for a plurality of entities and historical fraud risk data for a plurality of data transfers for a plurality of entities; determining whether the likelihood that the first data transfer fails without completion after being initiated is below a data transfer failure threshold; and in response to a determination that the likelihood that the first data transfer fails without completion is below the data transfer failure threshold, sending, to the data transfer server over the communications network, a request to initiate a second data transfer from the intermediary account to the second account.

In some examples, the method further comprises: requesting, from a risk assessor server over the communications network, the fraud risk data concerning one or both of the first entity and the second entity; and receiving, from the risk assessor server over the communications network, the fraud risk data concerning one or both of the first entity and the second entity.

In some examples, the method further comprises: requesting, from a data verifier server over the communications network, first provisioning data specifying how to perform a data transfer from the first account of the first entity; and receiving, from the data verifier server over the communications network, the first provisioning data.

In some examples, the method further comprises: receiving, from the data verifier server, a token identifying the first entity; and requesting, from the data verifier server, identifying information of the first account, wherein the token is provided with the request as authorization to obtain the identifying information of the first account; and receiving, from the data verifier server, identifying information of the first account.

In some examples, the method further comprises: after a threshold duration from a time at which that the request to initiate the first data transfer was sent and while the first data transfer is in flight: requesting, from the data verifier server over the communications network, second provisioning data specifying how to perform a data transfer to the second account of the second entity; and receiving, from the data verifier server over the communications network, the second provisioning data.

In some examples, the data verifier server is distinct from the application server.

In some examples, the method comprises: determining whether a data transfer matching the first data transfer for the threshold duration is found in the transaction data for the first account by comparing an amount, a direction, and a description of the first data transfer and the transaction data for the first account of the first entity for the threshold duration.

In some examples, the threshold duration is 1 or 2 business days.

In some examples, determining the likelihood that the first data transfer fails without completion after being initiated based on predetermined authorization criteria comprises: determining whether the following conditions have been met: (i) a current account balance of the first account less an amount of a first financial transaction that comprises the first data transfer is greater than or equal to a threshold amount; (ii) a data transfer in an opposite direction to the first data transfer for the same or approximately the same size as the first data transfer; (iii) an available account balance of the first account is greater than or equal to a threshold amount; (iv) an expected account balance of the first account is greater than or equal to a threshold amount, wherein expected account balance adjusting for a data transfer in an opposite direction to the first data transfer for the same or approximately the same size as the first data transfer; (v) a history of non-sufficient funds (NSF) transactions of the first account meets NSF criteria; (vi) whether the first account is overdrawn; (vii) a credit rating of the first entity is greater to or equal to a credit rating threshold; (viii) a status of a data transfer matching the first data transfer meets status criteria; and (ix) the fraud risk data satisfies fraud risk criteria; wherein it is determined that the likelihood that the first data transfer fails without completion after being initiated is greater than or equal to the data transfer failure threshold in response to a determination that any one of the previous conditions have been met.

In some examples, the fraud risk criteria is dependent on a type and/or size of the first data transfer, an amount and/or type of the fraud risk data, and an identity of the first entity.

In some examples, the method further comprises: determining a country and/or financial instruction associated with the first account based on account information for the first account; and determining the predetermined authorization criteria based on the determined country and/or financial instruction associated with the first account.

In some examples, the method further comprises: receiving from the second entity a request to generate a data transfer instruction; generating the data transfer instruction using application data stored in a database of the application server; and notifying the first entity of the generated data transfer instruction.

In some examples, notifying the first entity of the generated data transfer instruction comprises: sending an electronic message to a message address of the first entity stored in the database of the application server, the electronic message including the generated data transfer instruction or a notification of the generation of the data transfer instruction.

In some examples, the data transfer instruction comprises an invoice.

In some examples, the electronic message is an email message or in-application notification.

In some examples, the method further comprises: in response to success or failure of the requested data transfer from the first account of the first entity to the second account of the second entity, sending an electronic message to a message address of the first entity, the electronic message including a notification of success or failure of the requested data transfer.

In some examples, the data transfers comprise financial transactions.

In some examples, the data transfer information comprises transaction information.

In accordance with another aspect of the present disclosure, there is provided a server, comprising: a processor; a memory coupled to the processor, the memory storing executable instructions that, when executed by the processor, cause the server to perform the methods described above and herein.

In accordance with a further aspect of the present disclosure, there is provided a non-transitory machine-readable medium having tangibly stored thereon executable instructions that, when executed by a processor of a server, cause the server to perform the methods described above and herein.

Example Communication System

Reference is first made to FIG. 1A which shows in schematic block diagram form a communication system 100 in accordance with a first example embodiment of the present disclosure. The communication system 100 comprises a plurality of client devices 102 (only one of which is shown in FIG. 1A) that connect to an application server 120 operated by an application service provider via a communication network (not shown) such as the Internet. The application server 120 may comprise one or more server devices or modules. Each server device comprises a processor and a memory storing instructions that, when executed by the processor, configure the server to perform the functionality described herein. Entities, such as users, may register to use the application server 120. Each registered entity has an account stored in a registry 122. Each account entry or record store credentials to be used for accessing the application server 120. Each account also has associated application data stored in a database 126 by the application server 120. Access to the application data stored in the database 126 is restricted to registered entities/users for the respective account. The application data may comprise a data transfer history for each account. The data transfer history may comprise a plurality of records, one record for each data transfer facilitated or performed by the application server 120. The application server 120 provides a graphical user interface (GUI), such as a dashboard, for interfacing with the application server 120. Registered entities/users may use the dashboard to access a number of applications 124. In some examples, the application server 120 is implemented as a number of interacting application modules.

Each client device 102 comprises a processor and a memory storing instructions that, when executed by the processor, configure the client device 102 to perform the functionality described herein. The client devices 102 are configured to access a GUI 110 provided by or through the application server 120 to communicate with the application server 120. The GUI 110 may be provided by a Web browser 344 (FIG. 3), a data transfer application 346 (FIG. 3) or other suitable programming interface on the client device 102. The client device 102 may be a smartphone, a laptop computer, a desktop computer, a tablet, or other suitable processing device.

The application server 120 also communicates with a data transfer server 130, also known as a data processor or payment processor, via a communication network (not shown) such as the Internet. The data transfer server 130 may be operated by a third-party unrelated to the service provider of the application server 120. Registered entities/users may also have an account with the data transfer server 130 stored in a registry 132 in which credentials for accessing the data transfer server 130 are stored. The application server 120 comprises a database 136 which stores data, such as a data transfer history for each data transfer facilitated or performed by the application server 120. The data transfer server 130 interfaces with a plurality of data providers 142 with which data transfers are performed with respect to a number of data sources, such as databases 144.

The application server 120 also communicates with one or more secondary data providers 146 (only one of which is shown in FIG. 1A) via a communication network (not shown) such as the Internet. A secondary data provider 146 may be one of the data providers 142. The secondary data providers 146 securely provide profile data comprise one or more of account data, data transfer data or risk data about entities/users of the application server 120 information to the application server 120. The profile data may be limited to unregistered entities/users of the application server 120. The account and data transfer data may comprise data transfer status (e.g., initiated, pending or posted), account balance or status, etc. In embodiments in which the data transfer is a financial transaction, the account and data transfer data may comprise pending and posted data transfers/transactions, account balance, non-sufficient funds (NSF) fee history, credit history, credit core, data transfers/transactions similar to initiated data transfers/transaction, etc.

The secondary data provider 146 may securely provide to the application server 120 fraud risk data or information regarding one or both of the sending entity or receiving entity of a data transfer, as described more fully below. The fraud risk data is concerned with a possibility or likelihood that an account of the sending entity or receiving entity has been compromised by a fraudster or other person other than an authorized user.

The application server 120 also communicates with one or more data verifiers 140 (only one of which is shown in FIG. 1A) via a communication network (not shown) such as the Internet. A data verifier 140 may be one of the data providers 142 and/or 146. The data verifiers 140 may be operated by a third-party unrelated to the service provider of the application server 120. A data verifier 140 verifies credentials provided by an unregistered entity/user and generates and sends a token for secure communication with the application server 120 when authorized to communicate with the application server 120 by respective unregistered entity/user.

Figure 1B:
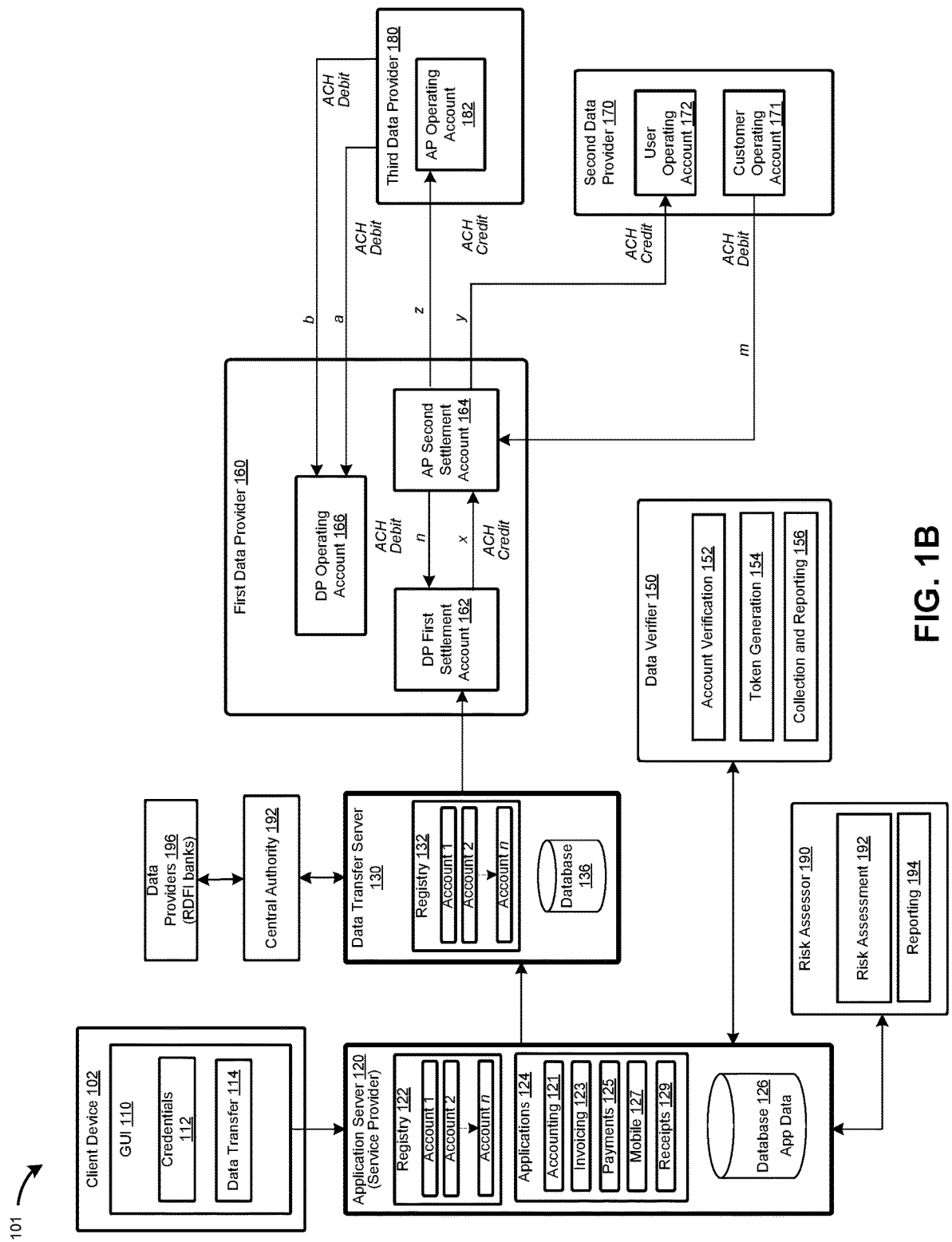
FIG. 1B is a schematic block diagram illustrating a communication system in accordance with a second example embodiment of the present disclosure.

Reference is next made to FIG. 1B which shows in schematic block diagram form a communication system 101 in accordance with a second example embodiment of the present disclosure in which the communication system 101 is used to process and manage accounting and financial data. The communication system 101 comprises a plurality of client devices 102 (only one of which is shown in FIG. 1B) that connect to an application server 120 operated by an application service provider via a communication network (not shown) such as the Internet. The application server 120 may comprise one or more server devices or modules. Each server device comprises a processor and a memory storing instructions that, when executed by the processor, configure the server to perform the functionality described herein.

Entities, such as users, may register to use the application server 120. Each registered entity has an account stored in a registry 122. Each account entry or record store credentials to be used for accessing the application server 120. Each account also has associated application data stored in a database 126 by the application server 120. The application data stored in the database 126 may comprise accounting and financial data, data transfer/transaction history, and fraud risk data. Registered entities/users are typically businesses that provide products and/or services to customers. The application server 120 may be used by businesses to generate and send invoices and to receive payment from customers, as described below. Customers may be non-registered users with no pre-existing relationship with the application service provider operating the application server 120. Alternatively, the customers may have previously registered with the application server 120 or the customers may be other business users.

The application server 120 may provide a GUI dashboard for user interaction with the application server 120. Businesses may use the GUI dashboard to access a variety of applications, functions and operations. The application server 120 may perform data processing with respect to accounting data and data transfer/transaction functions with respect to accounting and financial data. The application server 120 is implemented as a number of interacting application modules that comprise an accounting module 121 providing an accounting application, an invoice module 123 providing invoicing application or functions, a payment module 125 providing a payment application or functions, a refund/credit application or functions, a mobile application module 127 providing mobile support for smartphones and the like, and a receipt module 129 providing a receipt application or functions. Payment functions may or may not be based on an invoice previously generated by the invoice module 123, depending on the embodiment. For example, payments may be made by entities/users without an invoice and a receipt of payment may be generated by the receipt module 129. Other applications may also be provided by the application server 120 such as a reporting module (not shown) for generating a variety of accounting and financial reports, and a payroll module (not shown) for payroll functions. Each of these functions may utilize information and records relating to financial transactions that are stored by the application server 120 in the database 126. The accounting and financial data stored in the database 126 may be accessed by the application modules 121, 123, 125, 127, 129 and other modules in the performance of invoicing and other accounting functions.

The application server 120 communicates with one or more data verifiers 150 via a communication network (not shown) such as the Internet. The data verifiers 150 may be operated by a third-party unrelated to the service provider of the application server 120. The data verifiers 150 are data aggregator and verifiers that interact with data providers in the form of financial institutions (FIs) such as banks, financial clearing houses and credit card companies. Alternatively, each financial institution may provide its own data verifier.

The data verifier 150 provides at least three functional modules: account verification 152, token generation 154, and data collecting and reporting 156. The data verifiers 150 verifies banking credentials, generates and sends a token for secure communication with the application server 120 when authorized by users to do so, and obtains account details and a data transfer/transaction history for users, such as business customers, and securely provides this information to the application server 120.

The application server 120 communicates with one or more risk assessors 190 via a communication network (not shown) such as the Internet. A risk assessor 190 provides at least two functional modules: risk collection and assessment 192 and reporting 194. A risk assessor 190 assesses a risk of the entities involved in a data transfer so that the application server 120 determine a likelihood the data transfer may fail or otherwise not be completed after being initiated. The risk assessment performed by the risk assessor 190 may be based on fraud risk data or rating regarding one or both of the sending entity or receiving entity of a data transfer and/or the data transfer (e.g., financial transaction). The fraud risk data may comprise a fraud risk or rating of one or both of the sending entity or receiving entity of the data transfer, data/information relating to a pending/initiated data transfer/transaction, previous data transfers/transactions by the sending entity or receiving entity or data transfers/transactions authorized by the sending entity or receiving entity. The fraud risk data may include a location at which a pending/initiated data transfer/transaction was initiated and/or authorized, a previous location at which the sending entity or receiving entity initiated and/or authorized data transfers transactions, a messaging address (e.g., email address) and/or login credentials or other means used to initiate and/or authorize the pending/initiated data transfer/transaction, messaging address (e.g., email address) and/or login credentials or other means used to initiate or authorize previous data transfers/transactions, a processing device used to initiate or authorize the pending/initiated data transfer/transaction or previous data transfers/transactions among other factors, etc. An example of risk assessor 190 is the Threat-Metrix™ platform provided by RELX Group (UK).

The risk assessor 190 sends the fraud risk data to the application server 120 independent of user authorization. The fraud risk data/information provided to application server 120 is used by the application server 120 to determine whether to initiate a second financial transaction in response to a determination that a first financial transaction has been initiated by but has not yet been completed.

The application server 120 also communicates with a data transfer server 130 via a communication network (not shown) such as the Internet. The data transfer server 130 may be operated by a third-party unrelated to the service provider of the application server 120. In some examples, the data transfer server 130 may be a transaction or payment processor. An example of data transfer server 130 is the Vantiv™ platform provided by Vantiv, Inc. Businesses that are registered with the application server 120 may also have an account with the data transfer server 130. Account details, including login/sign-in credentials for accessing the data transfer server 130, are stored in the registry 134. Registered entities/users may also have an account with the data transfer server 130 stored in a registry 132 in which credentials for accessing the data transfer server 130 are stored. The application server 120 comprises a database 136 which stores application data, such as a data transfer history for each data transfer facilitated or performed by the application server 120 and possibly fraud risk data obtained from the risk assessor 190. The application data is stored on per account or per user (entity) basis. The data transfer server 130 interacts with data providers to perform or initiate data transfers, such as financial transactions. When the data providers are financial institutions such as banks and financial clearing houses, the data transfer server 130 interacts with the financial institutions to perform or initiate data transfers in the form of financial transactions at the request of the application server 120. The application server 120 analyses transaction data and/or stored risk data in combination with data from third-party data sources such as those of the risk assessor 190 to determine whether to initiate a second data transfer, for example instruct Vantiv to initiate a financial transaction or movement of funds.

The data transfer server 130 also communicates with a data transfer network via a communication network (not shown) such as the Internet. The data transfer network may comprise a conventional banking network. In the shown example, the data transfer server 130 communicates with a central (banking) authority 192 such as the Federal Reserve of the United States of America (USA) which in turn communicates with a plurality of receiving depository financial institution (RDFI) banks 196. An RDFI is a financial institution qualified to receive ACH (Automated Clearing House) entries. These institutions are required by regulation to abide by the NACHA (National Automated Clearing House Association) Rules.

In the shown example, in causing a data transfer in the form of a financial transaction to be performed, the data transfer server 130 may interact with a plurality of RDFI banks 196, designated as a first data provider 160, a second data provider 170, and a third data provider 180. A data transfer in the form of a payment from a customer to a business involves a first financial transaction in the form of an ACH debit transaction and a second financial transaction in the form of an ACH credit transaction.

In an ACH debit transaction, the data transfer server 130 instructs a data provider, such as the second data provider 170, to initiate a first ACH debit transaction for an amount m from the customer's operating account 171 of the customer at the second data provider 170 to a Second Settlement Account 164 at the first data provider 160. The data transfer server 130 also instructs the first data provider 160 to initiate a second ACH debit transaction for an amount n from the Second Settlement Account 164 at the first data provider 160 to a First Settlement Account 162 at the first data provider 160. The First Settlement Account 162 is a dedicated settlement account for the service provider of the data transfer server 130 whereas the Second Settlement Account 164 is a commingled settlement account with funds for all registered entities/users (e.g., businesses) of the application server 120.

In an ACH credit transaction, the data transfer server 130 instructs the first data provider 160 to initiate a first ACH credit transaction for an amount x from a First Settlement Account 162 at the first data provider 160 to a Second Settlement Account 164 at the first data provider 160. The data transfer server 130 also instructs the first data provider 160 to initiate a second ACH credit transaction for an amount y from the Second Settlement Account 164 at the first data provider 160 to an operating account 172 of the registered entity/user (e.g., business) at the second data provider 170.

Service fees/charges may be charged by the service provider of the data transfer server 130 and/or the service provider of the application server 120 in some examples. In one such example, the data transfer server 130 also instructs the first data provider 160 to initiate a third ACH credit transaction for an amount z from the Second Settlement Account 164 at the first data provider 160 to an operating account 182 of the service provider of the application server 120 at the third data provider 180. In some examples, the amount of the third ACH credit transaction, z, represents a charge/fee of the service provider of the application server 120 whereas the amount of the second ACH credit transaction, y, represents the difference between the amount of the first ACH credit transaction, x, and the amount of the third ACH credit transaction, z (e.g., $y=x-z$).

The data transfer server 130 may also instruct the third data provider 180 to initiate a first ACH debit transaction for an amount a from the operating account of the service provider of the application server 120 to an operating account 166 of the service provider of the data transfer server 130 at the first data provider 160. The data transfer server 130 may also instruct the third data provider 180 to initiate a second ACH debit transaction for an amount b from the operating account of the service provider of the application server 120 to the operating account 166 of the service provider of the data transfer server 130 at the first data provider 160. The amount of the first ACH debit transaction, a, represents charges/fees of the service provider of the data transfer server 130 whereas the amount of the second ACH debit transaction, b, represents chargebacks of the service provider of the data transfer server 130 for costs incurred by the service provider of the data transfer server 130, such as various fees and chargebacks.

Although several different data providers are shown and described for the purpose of explanation, it will be appreciated that the same data provider may be used for each segment of a data transfer/transaction between a first entity and a second entity. Each of the entities 160, 170, 180, 190, 196 comprises one or more servers, each comprising or being linked to a database storing data, such as financial data and data transfer/transaction data. Although individual servers are described herein, it will be appreciated that any of the described servers may be implemented as one or more server modules across one or more server devices. Also, although not described, it will be appreciated that the servers are typically each located behind a firewall (not shown).

It will be appreciated that the above-described communication systems are provided for the purpose of illustration only and that the above-described communication systems comprises example communication network configurations out of a multitude of possible configurations. Suitable variations of the communication systems will be understood to a person of skill in the art and are intended to fall within the scope of the present disclosure. For example, although examples of banking entities and regulations of the USA have been described, the teachings of the present disclosure are not intended to be limited to finance or to financial transactions within the USA, and are applicable to other countries and jurisdictions such as Canada, the United Kingdom (UK) and Australia.

Figure 2:
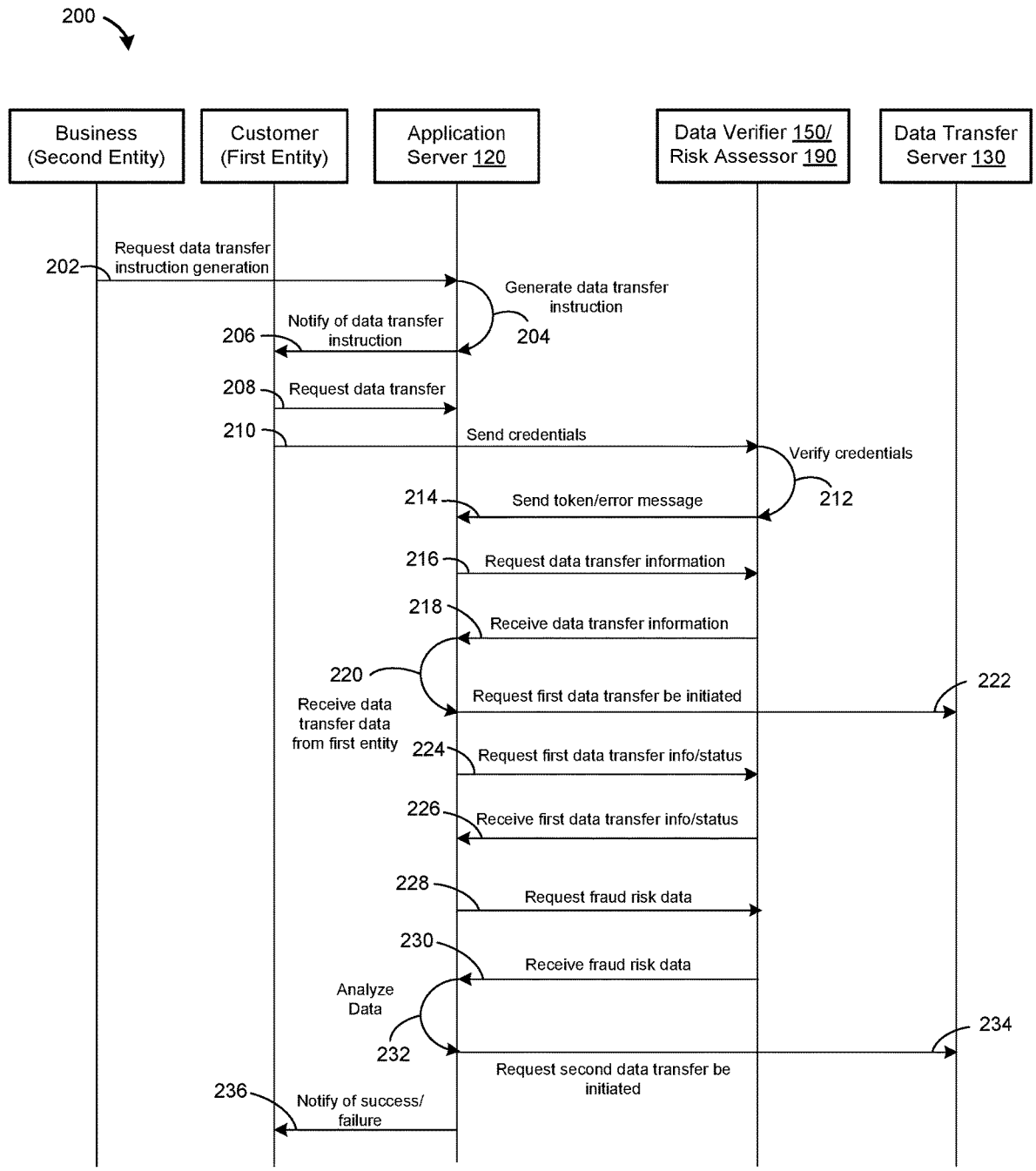
FIG. 2 is a sequence diagram illustrating a data transfer method in accordance with one embodiment of the present disclosure.
Figure 3:
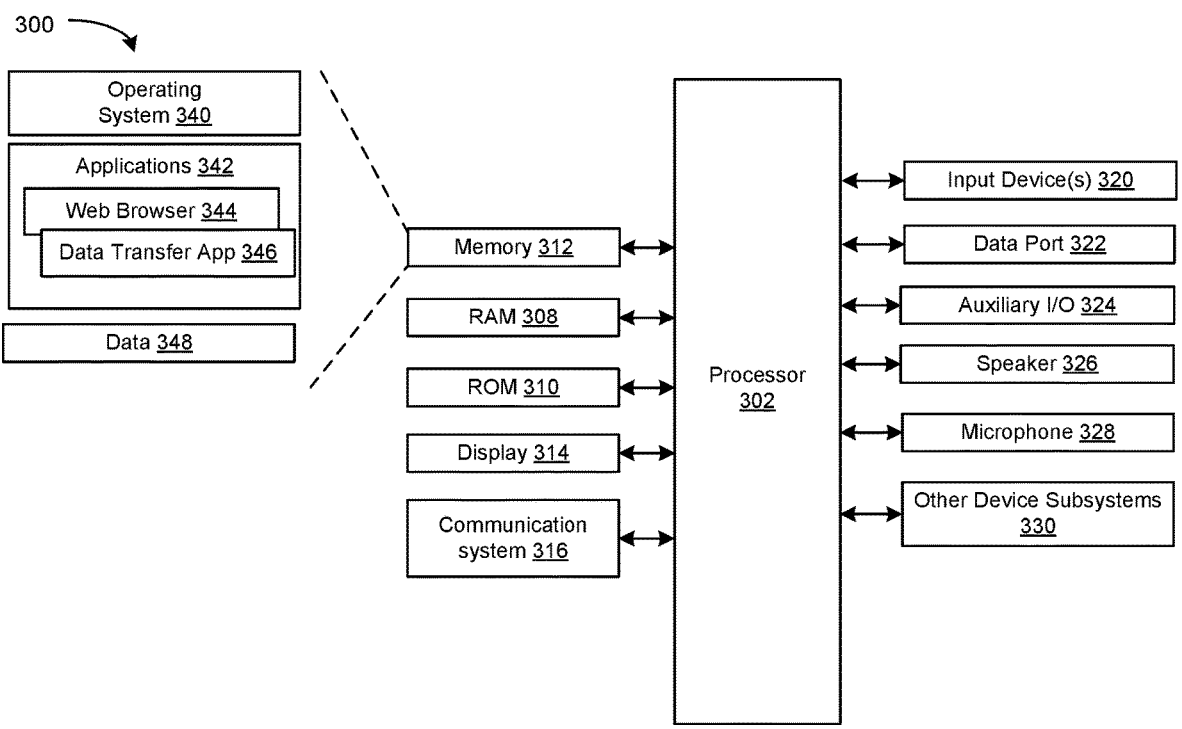
FIG. 3 is a schematic block diagram illustrating a processing device suitable for use as a client or server in the communication system of FIG. 1A.

FIG. 2 is a sequence diagram illustrating a data transfer method 200 in accordance with one embodiment of the present disclosure. The following description uses a financial transaction as an example of a data transfer for the purpose of illustration. However, the method 200 is not limited to financial transactions. In the described example, the financial transaction is between a first entity and a second entity. The first entity may be a user such as a customer of a business. The second entity may be the business to which the first entity is a customer. The second entity is registered with the application server 120 however the first entity may not be registered with the application server 120. The second entity, as a registered entity, may provide a product and/or service to the first entity for which the first entity seeks to render an invoice for payment or a credit note or the like for a refund. The first entity and second entity each access the application server 120 via a processing device, an example of which is shown in FIG. 3.

At operation 202, a business owner (second entity) requests that the application server 120 generate a data transfer instruction. The data transfer instruction may be a message or document. The data transfer may be a financial transaction or funds transfer, and the message or document may be an invoice or a credit note or the like. The request is sent from a processing device of the second entity to the application server 120 using a communication network, such as the Internet. The second entity (e.g., business) is registered with the application server 120 and has a profile as well as stored application data, such as financial, accounting data and fraud risk data, stored in the database 126. As a preliminary operation (not shown), the second entity may need to securely log in to the application server 120.

At operation 204, in response to receiving a request to generate a data transfer instruction, the application server 120 generates the data transfer instruction. The application server 120 may generate the data transfer instruction using stored application data in the database 126, such as financial and accounting data (e.g., such as purchase order and/or sales order data). The application server 120 may also add one or more records corresponding to the generated data transfer instruction to one or more databases of one or more applications of the application server 120 that are relevant to the generated data transfer instruction. For example, when the generated data transfer instruction is an invoice, the application server 120 adds a record corresponding to the newly generated invoice to an invoice database of the invoicing application 123. The application server 120 may also add a record corresponding to the newly generated invoice to a fraud risk database.

At operation 206, when a data transfer instruction (e.g., invoice) is generated, the application server 120 notifies the customer (first entity) of the generated data transfer instruction, for example by an electronic message such as email or an in-application notification on the data transfer application 346. The electronic message may include a deep link, in the form of a Uniform Resource Locator (URL), to the data transfer instruction. By clicking or otherwise selecting the deep link, the data transfer instruction may be displayed in a web page hosted by the application server 120 via the Web browser 344. Alternatively, the first entity may navigate directly to the URL via a navigation bar of the Web browser 344. When the data transfer instruction is an invoice, the web page may include a link to initiate a data transfer in the form of a bill payment or electronic funds transfer to pay the invoice. The data transfer instruction may also be sent as part of, or an attachment to, the electronic message depending on the type of electronic message. For example, the data transfer instruction may be included in the body of the electronic message or as attached to an email message.

At operation 208, after the customer (first entity) has been notified of the data transfer instruction, a request is sent by the first entity to the application server 120 to initiate a data transfer, for example a financial transaction such as bill payment or an electronic funds transfer. As noted above, the first entity may click or otherwise select a link in a web page comprising the data transfer instruction to cause the data transfer to be initiated, for example to initiate a bill payment or an electronic funds transfer to pay the invoice. As part of the request to initiate the data transfer, the first entity provides credentials to authenticate the first entity or an account of the first entity and to consent that the service provider of the application server 120 receive user information about the first entity, such as banking information about the first entity and/or a bank account of the first entity. For example, when the generated data transfer instruction is an invoice, selecting a payment link in an invoice web page may invoke the GUI 110 to generate a data transfer instruction such as a financial transaction in the form of a bill payment or an electronic funds transfer to pay the invoice.

The GUI 110 may include an authentication widget or other GUI element that prompts for and receives from the first entity identifying information identifying a financial institution (FI) from which funds for the bill payment or electronic funds transfer are to be withdrawn and bank credentials for a bank account of the first entity associated with that FI.

At operation 210, banking credentials are sent to the data verifier 150. As described above, the data verifier 150 is typically distinct from the application server 120. In the shown example, the banking credentials are sent directly from the processing device of the first entity to the data verifier 150. In other examples, the banking credentials may be sent indirectly to the data verifier 150 via the application server 120. As noted above, the data verifier 150 may be operated by a trusted third-party. When the communication system 101 is used for financial documents, the data verifier 150 may provide account and transaction data via an application programming interface (API) of the authentication widget. In some examples, the data verifier 150 may be provided by the Plaid™ account and transaction verification API from Plaid Technologies, Inc. or the Yodlee™ account and transaction verification API from Envestnet, Inc.

At operation 212, the data verifier 150 attempts to verify the provided banking credentials. In response to unsuccessful verification of the banking credentials by the data verifier 150, an error message is sent from the data verifier 150 to the application server 120 (not shown). At operation 214, in response to successful verification of the banking credentials by the data verifier 150, the data verifier 150 sends a token (or key) to the application server 120. The token is generated by the data verifier 150 only in response to successful verification of the banking credentials by the data verifier 150. The token acts as a unique identifier and may expire after a threshold amount of time. Multifactor authentication may be applied by the data verifier 150. The details of the token scheme are outside the scope of the present disclosure and will therefore not be described in detail herein. As an example, the token may be a random or algorithmically generated alphanumeric string that may be used to identify the first entity and/or the bank account of the first entity identified earlier and indicate that the application server 120 is authorized by the first entity to access banking information about the first entity and/or the bank account of the first entity.

At operation 216, the application server 120 requests data transfer information, also known as provisioning data, specifying how to send and/or receive a data transfer between the first entity and the second entity, including data transfer signals and other communications and any messages contained therein. The data transfers, when comprising financial transactions, may comprise remittances in which case the data transfer information may comprise remittance data. The remittances may be bill payments, bill payment instructions or electronic funds transfer instructions, in which case the data transfer information may comprise biller remittance data. The data transfer information and/or remittance data may comprise identifying bank account information from the bank account of the first entity using the token to identify the first entity and/or the bank account of the first entity and indicate that the application server 120 is authorized by the first entity to access banking information.

At operation 218, the application server 120 receives data transfer information, such as transaction information, remittance data or identifying bank account information, from the data verifier 150 when the token is verified by the data verifier 150. When the token is not verified by the data verifier 150, an error message is sent to the application server 120 (not shown). The identifying bank account information comprises a bank account number and routing number (or transition number and institution number, depending on the country), account type and balance for each account with the selected FI (selected by the user in operation 208 described above). The identifying bank account information may also include the account holder name and mailing address depending on the selected FI.

At operation 220, the application server 120 receives data transfer information, such as transaction information, and transaction authorization from the first entity through the GUI 110. The first entity provides a selection of a bank account, an amount to pay or transfer, and consents to the data transfer/transaction (e.g., payment). This information is then stored with the token by the application server 120.

At operation 222, the application server 120 requests that the data transfer server 130 initiate a first data transfer, such as a first financial transaction, between the account of the first entity identified by the data transfer information (e.g., banking information) received from the data verifier 150 and a designated account of the service provider of the application server 120. The first data transfer (e.g., first financial transaction) may be an ACH debit from the account of the first entity to the designated account of the service provider of the application server 120. An ACH debit deducts funds from an account.

At operation 224, at a time when the data transfer server 130 is expected to have initiated the first data transfer (e.g., first financial transaction), the application server 120 requests first data transfer data/status (e.g., transaction information/status) such as transaction data (e.g., bank account information) of the bank account of the first entity covering a threshold duration or period of time from the data verifier 150. The application server 120 request the third-party data provider, i.e. data verifier 150 such as Plaid™, for the transaction history data, which the data verifier 150 routinely fetches from the data provider (e.g., bank or other FI) of the first entity involved in the first data transfer (e.g., first financial transaction) using online banking login credentials provided earlier.

The threshold duration is typically 1 to 5 days from the date on which the request to initiate the first data transfer (e.g., first financial transaction) was sent. The data transfer server 130 is normally expected to have initiated the first data transfer (e.g., first financial transaction) within 1-4 business days, typically 1 or 2 business days, depending on the FI. Therefore, the application server 120 may request data transfer information the day after the request to initiate the first data transfer (e.g., first financial transaction) was sent. The requested data transfer information may comprise bank account information that comprise a subset of an account transaction history of the first entity (customer) from the data verifier 150, the current account balance and available account balance using the token as identifying information and authorization.

At operation 226, the application server 120 receives first data transfer information/status, for example in the form of the account transaction history, current account balance and possibly available account balance from the data verifier 150. Depending on the FI associated with the first entity, the available account balance may or may not be returned. The current account balance represents the total amount of funds currently in the account. The available account balance represented the total amount of funds in the account less any pending transactions that have been posted but have not cleared. The pending transactions may be credits or debits. The most relevant fields are typically the amount, date, pending, and memo or transaction description field, which is used as part of matching found transactions to the first financial transaction that was initiated by the application server 120 and that the application server 120 is look for. In some examples, for example when the data verifier 150 is Yodlee™, a transaction in the account transaction history may comprise the following information:

| Parameter Name | DescriDtion |
|---|---|
| transaction_id | unique id of the transaction |
| account_id | id of the account in which this transaction occurred |
| category | hierarchical array of the categories to which this transaction belongs |
| category_id | id of the category to which this transaction belongs |
| transaction_type | Place, Digital, Special, or Unresolved |
| amount | The settled dollar value. Positive values when money moves out of the account; negative values when money moves in. For example, purchases are positive; credit card payments, direct deposits, refunds are negative. |
| date | For pending transactions, returns the date the transaction occurred; for posted transactions, returns the date the transaction posts. Both dates are returned in an ISO 8601 format (YYYY-MM-DD). |
| location | detailed merchant location data including address, city, state, zip, lat (latitude), and lon (longitude) here available |
| payment | Detailed payment and payment processor data including reference_number, ppd_id, and payee_name where available |
| pending Boolean | when true, identifies the transaction as pending or unsettled. Pending transaction details (name, type, amount) may change before they are settled |
| pending_transaction_id | id of a posted transaction's associated pending transaction-where applicable |
| account_owner | name of the account owner. This field is |

At operation 228, the application server 120 requests fraud risk data concerning one or both of the first entity and second entity from the risk assessor 190.

At operation 230, the application server 120 receives the requested fraud risk data concerning one or both of the first entity and second entity from the risk assessor 190.

At operation 232, the application server 120 analyzes received data including bank account information and fraud risk data/information and determines whether the received data satisfies one or more predetermined authorization criteria for initiating a second data transfer, such as a second financial transaction. The one or more predetermined authorization criteria may vary between embodiments. The determining may comprise searching the transaction history to attempt to find a financial transaction matching the first financial transaction initiated through the data transfer server 130. To be matching financial transactions, the financial transactions have a matching amount, a matching direction (e.g., debit or credit), and at least a partially matching description. When matching the description, the description in the financial transactions of the transaction history are compared to a description provided to the data transfer server 130 in operation 222 when the data transfer server 130 was instructed to initiate the first data transfer (e.g., first financial transaction). The description may be a name, phrase word, number or other suitable alphanumeric string, typically ignoring all spaces and special characters and considering only alphanumeric characters. The description may be generic or unique to the transaction.

When a matching transaction is found, there is a high degree of confidence that the first data transfer (e.g., first financial transaction) will be successfully completed. Typically, bank payments fail before the payment is initiated, for example due to NSF in the corresponding account). Thus, when the first financial transaction is in progress and the transaction has been posted in the account of the first entity (customer), the risk that the first data transfer (e.g., first financial transaction) will not be successfully completed is significantly reduced even though the data transfer has not been completed, e.g., the funds have not been deposited into the bank account of the service provider of the application server 120.

To determine whether one or more predetermined authorization criteria have been met, the application server 120 may determine whether one or more of the following conditions have been met: (i) a current account balance of the first account less an amount of a first financial transaction that comprises the first data transfer is greater than or equal to a threshold amount (e.g., zero); (ii) a data transfer (e.g., financial transaction) in an opposite direction (e.g., debit or credit) to the first data transfer for the same or approximately the same size as the first data transfer; (iii) an available account balance of the first account is greater than or equal to a threshold amount (e.g., zero); (iv) an expected account balance of the first account is greater than or equal to a threshold amount (e.g., zero), wherein expected account balance adjusting for a data transfer in an opposite direction to the first data transfer for the same or approximately the same size as the first data transfer; (v) a history of NSF transactions of the first account; (vi) whether the first account is overdrawn; (vii) a credit rating of the first entity is greater to or equal to a credit rating threshold; (viii) a status of a data transfer matching the first data transfer; or (ix) fraud risk data satisfies fraud risk criteria. The fraud risk criteria is dependent on a type and/or size of the first data transfer, an amount and/or type of the fraud risk data, and one or both of an identity of the first entity and second entity, as described more fully below.

To determine whether one or more predetermined authorization criteria have been met, the application server 120 may determine a likelihood that the first data transfer fails without completion after being initiated using the one or more predetermined authorization criteria, and determine whether the likelihood that the first data transfer fails without completion after being initiated is below a data transfer failure threshold. The application server 120 determines that the one or more predetermined authorization criteria have been met in response to a determination that the likelihood that the first data transfer fails without completion after being initiated is below the data transfer failure threshold. The determination of the likelihood that the first data transfer fails without completion after being initiated using the one or more predetermined authorization criteria may be based on the first data transfer information, the fraud risk data concerning one or both of the first entity and the second entity, and a data transfer history for one or both of the first entity and second entity stored in a database of the server.

The fraud risk criteria may not be fixed and may vary with the specific data transfer (e.g., financial transaction) such as the type and/or size, the available fraud risk data/information and/or the identity of the first entity and second entity. The application server 120 determines whether the fraud risk criteria are satisfied based on the fraud risk data received from the risk assessor 190 in operation 230. The application server 120 performs an assessment of fraud risk data/information to determine whether it meets the fraud risk criteria based on the fraud risk data received from the risk assessor 190 as well as data transfer (e.g., transaction) history for one or both of the first entity and second entity stored in database 126. The application server 120 may prompt a human risk assessment officer to determine whether fraud risk criteria have been met based on all of the above information.

In operation 232, the application server 120 may determine the likelihood that the data transfer may fail or otherwise not be completed after being initiated using the one or more predetermined authorization criteria based on the data transfer details, the identity of the first entity, the identity of the second entity, and bank account information of the first entity using the received fraud risk data/information from the risk assessor 190, the requested data transfer/transaction details (e.g., the type and/or size), balance information as well as historical data transfer (e.g., transaction) history and historical fraud risk data/information data available to application server 120.

The one or more predetermined authorization criteria are typically the same regardless of the country or FI. However, the one or more predetermined authorization criteria may vary based on one or more of the country or FI in some embodiments. For example, some countries and some FI have better internal controls and less stringent criteria could be applied for such countries or FIs. When a common set of one or more predetermined authorization criteria are applied across a range of countries and/or FIs, conservative values should be set for the one or more predetermined authorization criteria. For clarity, it is noted that third-party transaction data is provided by the data verifier 150 (e.g., Plaid™) and third-party risk data is provided by the risk assessor 190 (e.g., ThreatMetrix™) along it is completed that in other embodiments the functions and data of the data transfer server 130 (e.g., Vantiv™), data verifier 150 (e.g., Plaid™) and risk assessor 190 (e.g., ThreatMetrix™) could be incorporated into the application server 120 provided the respective data sets were isolated and protected for data security and privacy as desired or required by law or user requirements, although risk assessment may be enhanced by data and/or an evaluation from a third-party.

At operation 234, in response to a determination that the received data satisfies the one or more predetermined authorization criteria, the application server 120 sends a request to a data transfer server 130 to initiate a second data transfer (e.g., a second financial transaction) between the application server 120 and the second entity using bank account information stored by the data transfer server 130. The second financial transaction may be an ACH credit from the designated account of the service provider of the application server 120 to an account of the second entity (e.g., registered business user). An ACH credit adds funds to an account.

In response to a determination that the received data does not satisfy the one or more predetermined authorization criteria, for example when a matching transaction is not found, the application server 120 waits a predetermined amount of time (typically one day) and then re-attempts determining whether the received data satisfies the one or more predetermined authorization criteria, processing returning to operation 224. The application server 120 may re-attempt determining whether the received data satisfies the one or more predetermined authorization criteria several times, for example daily, until first data transfer is completed, for example until the funds of the first financial transaction are deposited into the account of the second entity (business). Alternatively, the application server 120 may wait for the first data transfer to be completed, i.e. until the funds are deposited into the account of the second entity (business).

At operation 236, the first entity (customer) is notified of the success or failure of the data transfer (e.g., financial transaction) for example, by an electronic message such as email or an in-application notification on the data transfer application 346.

Figure 4:
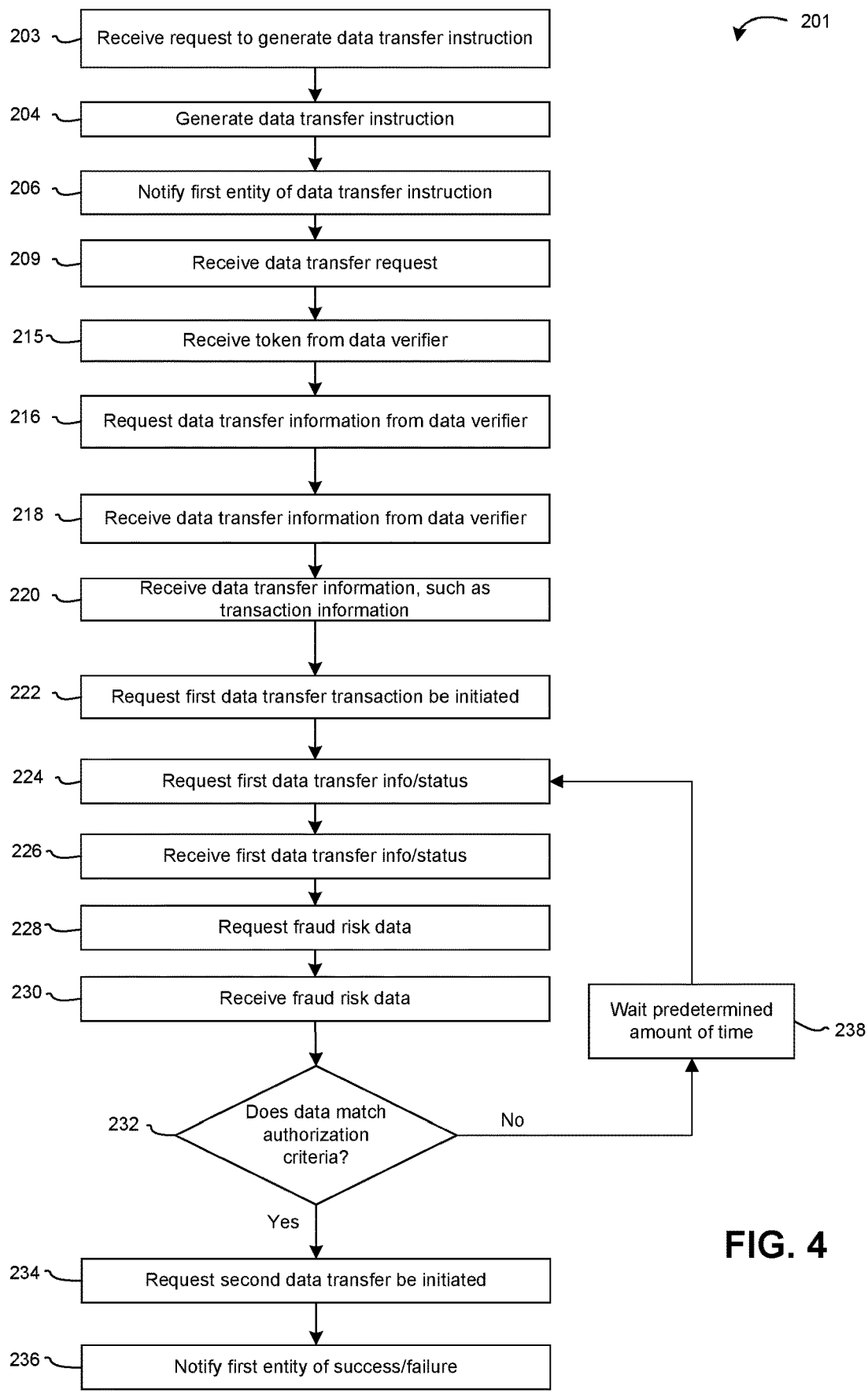
FIG. 4 is a flowchart illustrating a data transfer method by an application server in accordance with one embodiment of the present disclosure.

FIG. 4 is a flowchart illustrating a data transfer method 201 by an application server in accordance with one embodiment of the present disclosure. The method 201 is similar to the method 200 but illustrates operations from the perspective of the application server 120 only.

At operation 203, the application server 120 receives a request to generate a data transfer instruction. The data transfer instruction may be a message or document. The data transfer may be a financial transaction or funds transfer, and the message or document may be an invoice or a credit note or the like. When the data transfer instruction is an invoice, the business (second entity) provides a name for the invoice which is used in subsequent operations.

At operation 204, the application server 120 generates the data transfer instruction (e.g., invoice) based on the provided name and financial and accounting data in the database 126.

At operation 206, the application server 120 notifies the customer (first entity) of the data transfer instruction (e.g., invoice).

At operation 209, the application server 120 receives a request to initiate a first data transfer, such as a first financial transaction, from the customer (first entity).

At operation 215, the application server 120 receives a token from the data verifier 150 in response to successful verification of banking credentials by the data verifier 150.

At operation 216, the application server 120 requests data transfer information, also known as provisioning data from the data verifier 150. The data transfer information, may be or comprise remittance data, that may in turn comprise identifying bank account information about customer from the data verifier 150 from the bank account of the first entity using the token to identify the first entity and/or the bank account of the first entity and indicate that the application server 120 is authorized by the first entity to access banking information.

At operation 218, the application server 120 receives the data transfer information, such as data transfer information, such as transaction information, remittance data or identifying bank account information about the customer, from the data verifier 150, in response to a verification/validation of the token by the data verifier 150.

At operation 220, the application server 120 receives data transfer information, such as transaction information, and transaction authorization from the first entity, selection of an account for the data transfer/transaction such as a bank account, an amount to transfer (e.g., pay), and authorization/consent from the first entity to the data transfer/transaction (e.g., payment). This information is then stored with the token by the application server 120.

At operation 222, the application server 120 instructs the data transfer server 130 to initiate a first data transfer, such as a first financial transaction, between the account of the first entity identified by the data transfer information (e.g., banking information) received from the data verifier 150 and a designated account of the service provider of the application server 120. The first data transfer (e.g., first financial transaction) may be an ACH debit from the account of the first entity to the designated account of the service provider of the application server 120. An ACH debit deducts funds from an account.

At operation 224, at a time when the data transfer server 130 is expected to have initiated the first data transfer (e.g., first financial transaction), the application server 120 requests first data transfer information/status (e.g., transaction information/status) such as transaction data (e.g., bank account information) of the bank account of the first entity covering a threshold duration or period of time from the data verifier 150.

At operation 226, the application server 120 receives first data information/status, for example in the form of the account transaction history, current account balance and possibly available account balance (e.g., banking information about the customer from the data verifier 150) from the data verifier 150 when the token is verified/validated by the data verifier 150.

At operation 228, the application server 120 requests fraud risk data/information concerning one or both of the first entity and second entity from the risk assessor 190.

At operation 230, the application server 120 receives the requested fraud risk data concerning one or both of the first entity and second entity from the risk assessor 190.

At operation 232, the application server 120 analyses data including bank account information about the first entity (customer) and fraud risk data/information and determines whether the received data satisfies one or more predetermined authorization criteria for initiating a second data transfer, such as a second financial transaction. The application server 120 may determine a likelihood the data transfer may fail or otherwise not be completed after being initiated using the one or more predetermined authorization criteria based on the data transfer details, the identity of the first entity, the identity of the second entity, and bank account information of the first entity using the received fraud risk data/information from the risk assessor 190, the requested data transfer/transaction details (e.g., the type and/or size), balance information as well as historical data transfer (e.g., transaction) history and historical fraud risk data/information data available to application server 120.

At operation 234, in response to a determination that the received data satisfies the one or more predetermined authorization criteria, the application server 120 sends a request to a data transfer server 130 to initiate a second data transfer (e.g., a second financial transaction) between the application server 120 and the second entity using bank account information stored by the data transfer server 130. The second financial transaction may be an ACH credit from the designated account of the service provider of the application server 120 to an account of the second entity (e.g., registered business user). An ACH credit adds funds to an account.

In response to a determination that the received data does not satisfy the one or more predetermined authorization criteria, for example when a matching transaction is not found, processing proceeds to operation 238 in which the application server 120 waits a predetermined amount of time (typically one day) and then re-attempts determining whether the received data satisfies the one or more predetermined authorization criteria, processing returning to operation 224.

It will be appreciated that the methods and systems disclosed herein may be used for credits and refunds as well as payments. For example, the business (second entity) may connect to the application server 120 in the same manner as a user would access the application server 120 for a payment, and the same operations may be executed in reverse by looking for a data transfer/transaction originating from the business owner account 172 before returning the funds/money to the customer in the customer account 171.

As noted above, the present disclosure provides a server for automated data transfers and associated methods. Data transfers between entities, such as a first entity and second entity, are performed in two parts via an intermediary. The first data transfer is between a first entity and an intermediary. The second data transfer is between the intermediary and a second entity. The intermediary has access to or knowledge of the data that is subject to the data transfer, and can initiate the second data transfer based on the same data that was the subject of the first data transfer before the first data transfer is completed. For example, the intermediary may act as a repository, custodian or holder of the data that is the subject of the data transfer, even if only temporarily. The second data transfer is initiated in response to a determination that one or more predetermined criteria for initiating the second data transfer have been detected. In some examples, the data transfer may relate to financial data in some embodiments. When the data transfer relates to financial data, the first data transfer may comprise a first financial transaction (e.g., ACH debit) between a first entity and an intermediary (service provider) and the second data transfer may comprise a second financial transaction (e.g., ACH credit) between the intermediary and a second entity. The detection of the initiation of the first data transfer, as a predetermined criteria for initiating the second data transfer, may comprise detection/identification of "in-flight funds" related to the first financial transaction being transfer from an account of the first entity (e.g., a bank account of a first entity) before the funds are received by an account of the intermediary. The second financial transaction is in effect pre-funded by the application service provider operating the application server 120. This approach allows substantially faster data transfers, such as transactions, without substantially reducing security and without substantially increasing risk caused by the possibility of the first data transfer, such as, for example, a first financial transaction, failing particularly when compared with asynchronous systems. It is noted that although the application server 120 may have the necessary provisioning data to initiate a data transfer from a first account of the first entity to the second account of a second entity without an intermediary in some examples, the data transfer is nevertheless performed in two parts via an intermediary to attempt to achieve the objectives noted above.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program.

Example Processing Device

Reference is next made to FIG. 3 which illustrates in simplified block diagram form a processing device 300 suitable for use as a client or server in the communication system of FIG. 1A or FIG. 1B. The processing device 300 includes a controller comprising at least one processor 302 (such as a microprocessor) which controls the overall operation of the processing device 300. The processor 302 is coupled to a plurality of components via a communication bus (not shown) which provides a communication path between the components and the processor 302.

The processing device 300 comprises RAM 308, ROM 310, a persistent (non-volatile) memory 312 which may be flash EPROM ("flash memory") or other suitable form of memory, a display 314 such as a color liquid crystal display (LCD) or active-matrix organic light-emitting diode (AMOLED) display, a communication subsystem 316 for wired or wireless communication, one or more input device(s) 320, a data port 322 such as a serial data port (e.g., Universal Serial Bus (USB) data port), auxiliary input/outputs (I/O) 324, speaker 326, microphone 328, and other device subsystems. The input device(s) 320 may include a keyboard or keypad, one or more buttons, one or more switches, a touchpad, a rocker switch, a thumbwheel, or other type of input device. In addition to or instead of a keyboard or keypad, the display 314 may be provided as part of a touchscreen or touch-sensitive display which provides an input device 320.

Operating system software 340 executed by the processor 302 is stored in the persistent memory 312, such as flash memory, but may be stored in other types of memory devices, such as ROM 310 or similar storage element. User data 348 is also stored in the persistent memory 312. System software, software modules, specific device applications, or parts thereof, may be temporarily loaded into a volatile store, such as RAM 308, which is used for storing runtime data variables and other types of data or information. Communication signals received by the processing device 300 may also be stored in the RAM 308. Although specific functions are described for various types of memory, this is merely one example, and a different assignment of functions to types of memory may be used in other embodiments.

The processor 302, in addition to its operating system functions, enables execution of software applications 342 on the processing device 300. A predetermined set of applications or software modules that control basic device operations may be installed on the processing device 300 during manufacture. The persistent memory 312 includes installed applications and user data, such as saved files, among other data. The installed applications may include a web browser 344 and/or a data transfer application 346 that, when executed by the processor 302, causes the operations described herein to be performed.

The subject-matter of the disclosure may also relate, among others, to the following aspects:

1. A data processing and management method, comprising:
   requesting a data processor add a first record to a first database and add a first record to a second database, wherein the first record to be added to the second database matches the first record to be added to the first database;
   requesting from a data provider a subset of the records of the first database in response to a trigger;
   receiving from the data provider the subset of the records of the first database;
   when the subset of the records of the first database matches one or more criteria, requesting the data processor add a second record to the second database and add a first record to a third database, wherein the first record to be added to the third database matches the second record to be added to the second database.

2. The method of clause 1, further comprising:
   when the subset of the records of the first database matches the one or more criteria, requesting the data processor add a third record to the second database and add a first record to a fourth database, wherein the first record to be added to the third database matches the second record to be added to the second database.

3. The method of clause 1 or clause 2, further comprising:
   determining whether the subset of the records of the first database matches the one or more criteria.

4. The method of clause 3, wherein determining whether the subset of the records of the first database matches the one or more criteria:
   determining whether a record in the subset of the records of the first database corresponds to the first record to be added to the first database.

5. The method of clause 4, wherein each record in the first database comprises an amount field and a description field, wherein determining whether a record in the subset of the records of the first database corresponds to the first record to be added to the first database comprises:
   comparing a value of the amount field of the first record to be added to the first database to values of the amount field in the subset of the records of the first database;
   comparing a value of the description field of the first record to be added to the first database to values of the first description field in the subset of the records of the first database;
   wherein a match is determined when the value of the amount field of the first record to be added to the first database matches a value of the amount field in the subset of the records of the first database and the value of the description field of the first record to be added to the first database at least partially matches a value of the first description field in the subset of the records of the first database.

6. The method of clause 5, wherein determining whether the subset of the records of the first database matches the one or more criteria further comprises:
   requesting from the data provider a current balance;
   determining whether a value of the current balance less the value of the first amount field of the first record to be added to the first database is greater than or equal to a first threshold.

7. The method of clause 6, wherein the first threshold is zero.

8. The method of clause 5, wherein determining whether the subset of the records of the first database matches the one or more criteria further comprises:
   requesting from the data provider an available balance;
   determining whether a value of the available balance is greater than or equal to a first threshold.

9. The method of clause 8, wherein the first threshold is zero.

10. The method of any one of clauses 1 to 9, wherein the trigger is the expiry of a threshold period of time.

11. The method of any one of clauses 1 to 10, wherein the databases comprise data tables.

12. The method of clause 11, wherein the data tables represent bank account journals.

13. The method of any one of clauses 1 to 12, wherein the data provider is a financial institution.

14. A method by an application server of data processing and data transaction initiation, comprising:
   receiving from a first user a request to initiate a data transaction from a first account to a second account;
   requesting a data processor initiate a first data transaction from the first account to an intermediary account;
   requesting from a data verification system account information for the first account;
   receiving from the data verification system account information for the first account;
   when the account information for the first account matches data transaction criteria, requesting the data processor initiate a second data transaction from the intermediary account to the second account.

15. The method of clause 14, further comprising:
   receiving from the data verification system a token identifying the first user;
   requesting from the data verification system identifying information of the first account, wherein the token is provided with the request as authorization to obtain the identifying information of the first account;
   receiving from the data verification system identifying information of the first account.

16. The method of clause 14 or 15, further comprising:
   receiving from a second user a request to generate a document;
   generating the document using application data stored by the application server;
   notifying the first user of the generated document.

17. The method of clause 16, wherein the notifying comprises sending an electronic message to the first user.

18. The method of clause 16 or clause 17, wherein the document is an invoice.

19. The method of any one of clauses 14 to 18, further comprising:
   determining whether the account information for the first account matches data transaction criteria.

20. The method of clause 19, wherein the account information comprises a data transaction history of the first account, wherein determining whether the account information for the first account matches data transaction criteria comprises:
    determining whether an entry corresponding to the first data transaction appears in the data transaction history of the first account.
21. The method of clause 20, wherein determining whether an entry corresponding to the first data transaction appears in the data transaction history of the first account comprises:
    comparing an amount of the first data transaction to values in an amount field of the data transactions of the data transaction history;
    comparing a direction of the first data transaction to a direction of the transactions in the data transaction history, wherein the direction is indicated as being a credit or a debit; and
    comparing a description associated with the first data transaction to a description field of the data transactions of the data transaction history;
    comparing a value of the description field of the first account to be added to the first database to values of the first description field in the subset of the accounts of the first database;
    wherein a match is determined when the value of the amount field of the first account to be added to the first database matches a value of the amount field in the subset of the accounts of the first database and the value of the description field of the first account to be added to the first database at least partially matches a value of the first description field in the subset of the accounts of the first database.
    wherein a match is determined when the amount of the first data transaction matches an amount of a data transaction in the data transaction history, when the direction of the first data transaction matches the direction of the data transaction in the data transaction history, and when the description associated with the first data transaction at least partially matches the description field of the data transaction in the data transaction history.
22. The method of clause 20 or clause 21, wherein the account information comprises a current balance of the first account, the method further comprising:
    determining whether a value of the current balance less the value of the first amount field of the first account to be added to the first database is greater than or equal to a first threshold.
23. The method of clause 22, wherein the first threshold is zero.
24. The method of any one of clauses 20 to 23, wherein the account information comprises an available balance of the first account, the method further comprising:
25. The method of clause 24, wherein the first threshold is zero.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:
1. An application server for generating automated financial transactions, the application server comprising:
    a processor;
    a communication system coupled to the processor for communication over a communications network;
    a memory coupled to the processor, the memory having tangibly stored thereon executable instructions that, in response to execution by the processor, cause the server to perform the following operations:
        receive a request to initiate a financial transaction from a first account of a first entity to a second account of the second entity, the request being associated with user credentials;
        send, to a data verifier server the user credentials for verification;
        receive, from the data verifier server, a token identifying the first entity in response to verification of the user credentials by the data verifier server;

request, from the data verifier server, first provisioning data specifying how to perform a data transfer from the first account of the first entity, wherein the token is provided with the request;
receive, from the data verifier server, the first provisioning data in response to verification of the token;
generate, from the request to initiate a data transfer and the first provisioning data, a request to initiate a first data transfer financial transaction from the first account of the first entity to an intermediary account of an intermediary entity different from the first entity and the second entity;
send the request to initiate the first financial transaction to a payment processor;
determine when a threshold duration from a time at which that the request to initiate the first financial transaction was sent has expired, wherein the threshold duration is set to expire before the first financial transaction has been completed; and
in response to a determination that the threshold duration from the time at which that the request to initiate the first financial transaction was sent has expired:
request, from the data verifier server, the transaction data for the first account of the first entity for the threshold duration, wherein the token is provided with the request;
receive, from the data verifier server, transaction data for the first account of the first entity for the threshold duration in response to verification of the token;
request, from a risk assessor server, the fraud risk data concerning one or both of the first entity and the second entity, wherein the token is provided with the request;
receive, from the risk assessor server, fraud risk data concerning one or both of the first entity and the second entity in response to verification of the token;
determine a likelihood that the first financial transaction fails without completion based on whether one or more predetermined authorization criteria have been met, wherein the predetermined authorization criteria are based on the transaction data or the fraud risk data, and wherein determining whether one or more predetermined authorization criteria have been met comprises determining whether one or more of the following conditions have been met:
(i) a current account balance of the first account less an amount of a first financial transaction that comprises the first financial transaction is greater than or equal to a threshold amount;
(ii) a financial transaction in an opposite direction to the first financial transaction for the same or approximately the same size as the first financial transaction;
(iii) an available account balance of the first account is greater than or equal to a threshold amount;
(iv) an expected account balance of the first account is greater than or equal to a threshold amount, wherein expected account balance adjusting for a financial transaction in an opposite direction to the first financial transaction for the same or approximately the same size as the first financial transaction;

(v) a history of non-sufficient funds (NSF) transactions of the first account meets NSF criteria;
(vi) whether the first account is overdrawn;
(vii) a credit rating of the first entity is greater to or equal to a credit rating threshold;
(viii) a status of a financial transaction matching the first financial transaction meets status criteria; and
(ix) the fraud risk data satisfies fraud risk criteria;
in response to a determination that the likelihood that the first financial transaction fails without completion is below a threshold, generate and send to the payment processor, a request to initiate a second financial transaction from the intermediary account to the second account; and
in response to a determination that the likelihood that the first financial transaction fails without completion is greater than or equal to the threshold, refraining to generate and send the request to initiate the second financial transaction from the intermediary account to the second account.

2. The application server of claim 1, wherein the executable instructions, when executed by the processor, cause the application server to:
in response to the determination that the threshold duration from the time at which that the request to initiate the first financial transaction was sent has expired:
request, from the data verifier server, second provisioning data specifying how to perform a financial transaction to the second account of the second entity; and
receive, from the data verifier server, the second provisioning data.

3. The application server of claim 1, wherein the threshold duration is 1 or 2 business days.

4. The application server of claim 1, wherein the fraud risk criteria is dependent on a type and/or size of the first financial transaction, an amount and/or type of the fraud risk data, and an identity of the first entity.

5. The application server of claim 1, wherein the executable instructions, in response to execution by the processor, cause the application server to:
determine a country and/or financial instruction associated with the first account based on account information for the first account; and
determine the predetermined authorization criteria based on the determined country and/or financial instruction associated with the first account.

6. The application server of claim 1, wherein the executable instructions, in response to execution by the processor, cause the application server to:
receive from the second entity a request to generate an invoice;
generate the invoice using application data stored in a database of the application server; and
send an electronic message to a message address of the first entity stored in the database of the application server, the electronic message including the invoice or a notification of the generation of the invoice.

7. The application server of claim 6, wherein the electronic message is an email message or in-application notification.

8. The application server of claim 1, wherein the executable instructions, in response to execution by the processor, cause the application server to:
in response to success or failure of the requested data transfer financial transaction from the first account of the first entity to the second account of the second entity, send an electronic message to a message address of the first entity, the electronic message including a notification of success or failure of the requested financial transaction.

9. The application server of claim 1, wherein the data verifier server is distinct from the application server.

10. The application server of claim 1, wherein the executable instructions, when executed by the processor, cause the application server to:
determine whether a financial transaction matching the first financial transaction for the threshold duration is found in the transaction data for the first account by comparing an amount, a direction, and a description of the first financial transaction and the transaction data for the first account of the first entity for the threshold duration.

11. The application server of claim 1, wherein the executable instructions, when executed by the processor, cause the application server to:
in response to a determination that the likelihood that the first financial transaction fails without completion is below the threshold:
request, from the data verifier server, second provisioning data specifying how to perform a financial transaction to the second account of the second entity; and
receive, from the data verifier server, the second provisioning data.

12. The application server of claim 1, wherein the executable instructions, when executed by the processor, cause the application server to perform the operations in the order recited.

13. A method of generating automated financial transactions, the method performed by an application server, comprising the following steps:
receiving a request to initiate a financial transaction from a first account of a first entity to a second account of the second entity different from the first entity, the request being associated with user credentials;
sending, to a data verifier server the user credentials for verification;
receiving, from the data verifier server, a token identifying the first entity in response to verification of the user credentials by the data verifier server;
requesting, from the data verifier server, first provisioning data specifying how to perform a data transfer from the first account of the first entity, wherein the token is provided with the request;
receiving, from the data verifier server, the first provisioning data in response to verification of the token;
generating, from the request to initiate a data transfer and the first provisioning data, a request to initiate a first financial transaction from the first account of the first entity to an intermediary account of an intermediate entity different from the first entity and the second entity;
sending the request to initiate the first financial transaction to a payment processor;
determining when a threshold duration from a time at which that the request to initiate the first financial transaction was sent has expired, wherein the threshold duration is set to expire before the first financial transaction has been completed; and
in response to a determination that threshold duration from the time at which that the request to initiate the first financial transaction was sent has expired:

requesting, from the data verifier server, the transaction data for the first account of the first entity for the threshold duration, wherein the token is provided with the request;
receiving, from the data verifier server, transaction data for the first account of the first entity for the threshold duration in response to verification of the token;
requesting, from a risk assessor server, the fraud risk data concerning one or both of the first entity and the second entity, wherein the token is provided with the request;
receiving, from the risk assessor server, fraud risk data concerning one or both of the first entity and the second entity in response to verification of the token;
determining a likelihood that the first data transfer financial transaction fails without completion based on whether one or more predetermined authorization criteria have been met, wherein the predetermined authorization criteria are based on the transaction data or the fraud risk data, and wherein determining whether one or more predetermined authorization criteria have been met comprises determining whether one or more of the following conditions have been met:
(i) a current account balance of the first account less an amount of a first financial transaction that comprises the first financial transaction is greater than or equal to a threshold amount;
(ii) a financial transaction in an opposite direction to the first financial transaction for the same or approximately the same size as the first financial transaction;
(iii) an available account balance of the first account is greater than or equal to a threshold amount;
(iv) an expected account balance of the first account is greater than or equal to a threshold amount, wherein expected account balance adjusting for a financial transaction in an opposite direction to the first financial transaction for the same or approximately the same size as the first financial transaction;
(v) a history of non-sufficient funds (NSF) transactions of the first account meets NSF criteria;
(vi) whether the first account is overdrawn;
(vii) a credit rating of the first entity is greater to or equal to a credit rating threshold;
(viii) a status of a financial transaction matching the first financial transaction meets status criteria; and
(ix) the fraud risk data satisfies fraud risk criteria;
in response to a determination that the likelihood that the first financial transaction fails without completion is below the a threshold, generating and sending to the payment processor, a request to initiate a second financial transaction from the intermediary account to the second account; and
in response to a determination that the likelihood that the first financial transaction fails without completion is greater than or equal to the threshold, refraining from generating and sending the request to initiate the second financial transaction from the intermediary account to the second account.

14. A non-transitory machine-readable medium having tangibly stored thereon executable instructions that, in response to execution by a processor of an application server, cause the server to perform the following operations:

receive a request to initiate a financial transaction from a first account of a first entity to a second account of the second entity, the request being associated with user credentials;

send, to a data verifier server, the user credentials for verification;

receive, from the data verifier server, a token identifying the first entity in response to verification of the user credentials by the data verifier server;

request, from the data verifier server, first provisioning data specifying how to perform a data transfer from the first account of the first entity, wherein the token is provided with the request;

receive, from the data verifier server, the first provisioning data in response to verification of the token;

generate, from the request to initiate a data transfer and the first provisioning data, a request to initiate a first financial transaction from the first account of the first entity to an intermediary account of an intermediate entity different from the first entity and the second entity;

send the request to initiate the first financial transaction to a payment processor;

determine when a threshold duration from a time at which that the request to initiate the first financial transaction was sent has expired, wherein the threshold duration is set to expire before the first financial transaction has been completed; and in response to a determination that the threshold duration from the time at which that the request to initiate the first financial transaction was sent has expired:
  request, from the data verifier server over the communications network, the transaction data for the first account of the first entity for the threshold duration, wherein the token is provided with the request;
  receive, from the data verifier server, transaction data for the first account of the first entity for the threshold duration in response to verification of the token;
  request, from a risk assessor server over the communications network, the fraud risk data concerning one or both of the first entity and the second entity, wherein the token is provided with the request;
  receive, from the risk assessor server, fraud risk data concerning one or both of the first entity and the second entity in response to verification of the token;
  determine a likelihood that the first data transfer financial transaction fails without completion based on whether one or more predetermined authorization criteria have been met, wherein the predetermined authorization criteria are based on the transaction data or the fraud risk data, and wherein determining whether one or more predetermined authorization criteria have been met comprises determining whether one or more of the following conditions have been met:
    (i) a current account balance of the first account less an amount of a first financial transaction that comprises the first financial transaction is greater than or equal to a threshold amount;
    (ii) a financial transaction in an opposite direction to the first financial transaction for the same or approximately the same size as the first financial transaction;
    (iii) an available account balance of the first account is greater than or equal to a threshold amount;
    (iv) an expected account balance of the first account is greater than or equal to a threshold amount, wherein expected account balance adjusting for a financial transaction in an opposite direction to the first financial transaction for the same or approximately the same size as the first data transfer financial transaction;
    (v) a history of non-sufficient funds (NSF) transactions of the first account meets NSF criteria;
    (vi) whether the first account is overdrawn;
    (vii) a credit rating of the first entity is greater to or equal to a credit rating threshold;
    (vill) a status of a financial transaction matching the first financial transaction meets status criteria; and
    (ix) the fraud risk data satisfies fraud risk criteria;
  in response to a determination that the likelihood that the first financial transaction fails without completion is below a threshold, generate and send to the payment processor over the communications network, a request to initiate a second financial transaction from the intermediary account to the second account; and
  in response to a determination that the likelihood that the first financial transaction fails without completion is greater than or equal to the threshold, refraining to generate and send the request to initiate the second financial transaction from the intermediary account to the second account.

* * * * *